I. FURMAN.
COLOR PICTURE.
APPLICATION FILED MAY 29, 1920.
1,371,969.
Patented Mar. 15, 1921.
2 SHEETS—SHEET 1.
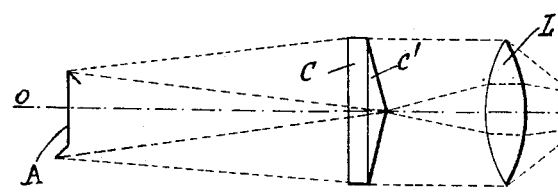 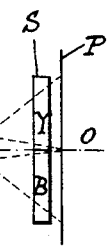
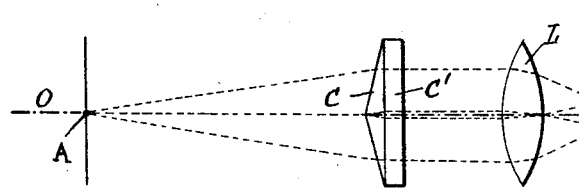 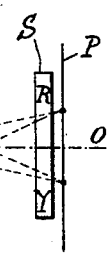
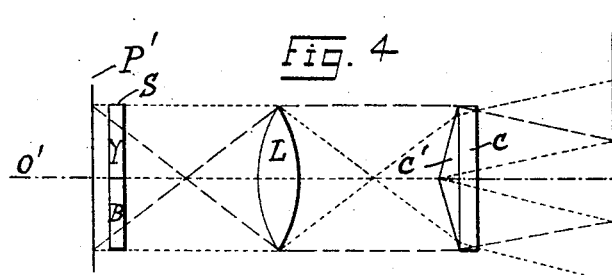 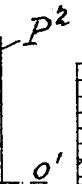 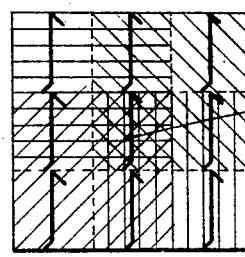
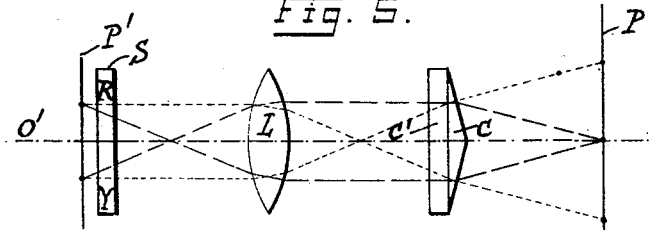  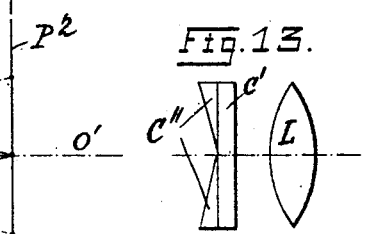
Ira Furman, INVENTOR.
BY
*Bresen Schrenk* ATTORNEYS I. FURMAN.
COLOR PICTURE.
APPLICATION FILED MAY 29, 1920.
1,371,969.
Patented Mar. 15, 1921.
2 SHEETS—SHEET 2.
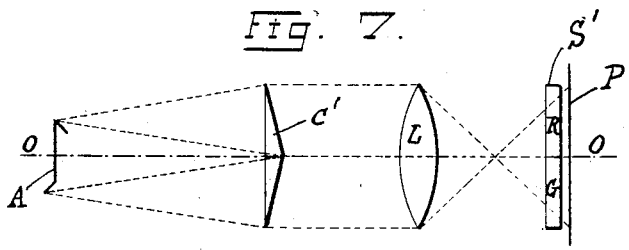
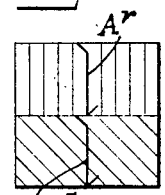
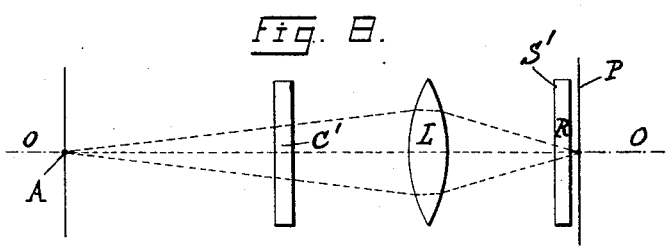
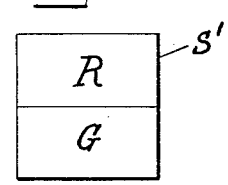
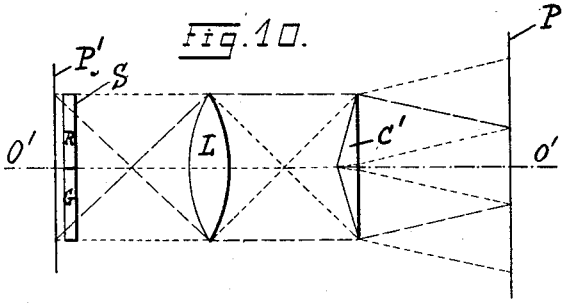
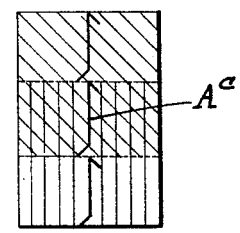
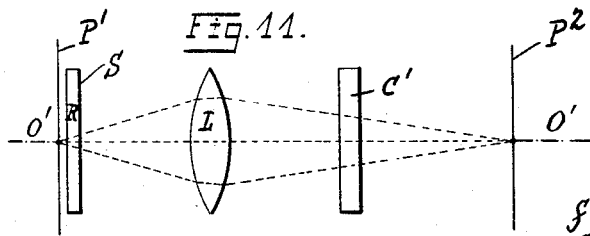
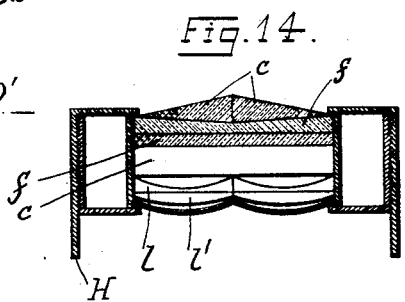
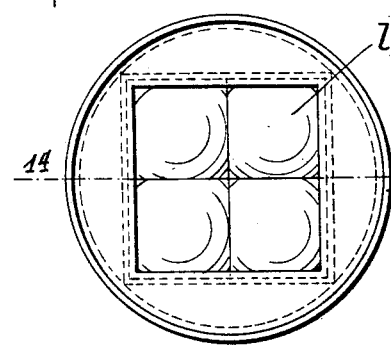
Ira Furman, INVENTOR.
BY
ATTORNEYS.

UNITED STATES PATENT OFFICE.

IRA FURMAN, OF NEW YORK, N. Y.

COLOR-PICTURE.

1,371,969.  Specification of Letters Patent.  Patented Mar. 15, 1921.

Application filed May 29, 1920. Serial No. 385,187.

*To all whom it may concern:*

Be it known that I, IRA FURMAN, a citizen of the United States, and a resident of the borough and county of the Bronx, city and State of New York, have invented a certain new and useful Improvement in Color-Pictures, of which the following is a specification.

This invention relates to color photography, and particularly to the projection of photographic images on a screen or like surface in such a manner as to obtain an image in the natural colors of the article or object photographed.

The apparatus utilized in my invention comprises one or more lenses (acting as an objective in taking the picture, and as a projector in throwing the picture on a screen), filters of different colors corresponding to different portions or fields of said lens or lenses, and refracting devices of prism character, the light passing successively through lens, color filters and refracting devices, in any order desired, and the relation of these parts being such as to either obtain a plurality of images (when making a photographic exposure) or combine a plurality of photographic images into a single projected image.

Various modes of carrying out my invention are illustrated in the accompanying drawings, in which Figures 1 and 2 are respectively a side elevation and a plan view showing in diagrammatic fashion a picture-taking apparatus embodying my invention and employing four colors; Fig. 1ª is a face view of the color filter; Fig. 3 is a diagram of the resulting camera image; Figs. 4 and 5 are diagrams in side elevation and plan view respectively illustrating a projecting apparatus for use in connection with images such as shown in Fig. 3; Fig. 6 is a diagram of the image projected by means of the apparatus shown in Figs. 4 and 5; Figs. 7 to 12 are views corresponding to Figs. 1 to 6 respectively, and illustrating the use of my invention in connection with two colors only. Fig. 13 is a side elevation showing another arrangement embodying my invention; and Figs. 14 and 15 show still another arrangement in top view and face view, respectively.

As illustrated in Figs. 1 and 2, an objective, indicated by a biconvex lens L, is combined optically with a transparent filter S having four square sections B, G, R, Y colored blue, green, red and yellow respectively, and with what I term a compound prism C, C', all of these parts being located in the line of the optical axis O, to form a series of images (as explained below) in the plane P, where I locate the sensitized layer (plate, or generally film) on which the pictures or images are formed by the exposure. I have shown these optical parts in the order prism, objective, color filter, but any other order may be used, and if the objective is compound color-corrected, either the color filter, or the refracting prism, or both, may be placed between the two members or elements of the objective.

The outlines of the compound prism C, C' and the screen S are shown shaped as squares, the sides of which are equal to the diameter of the objective L. The compound prism preferably consists of two triangular prisms C, C' which are alike except as to position, the axis of the prism C being vertical, and that of the prism C' horizontal. Thus the prism C will deflect the light laterally to left and right, while the prism C' will deflect the light upward and downward. The two prisms are connected in any suitable manner, as by cementing them with Canada balsam, or they might be integral with one another.

The course of the light when making an exposure is clearly indicated in Figs. 1 and and 2. It will be understood that the compound prism C, C' will act in such a manner as to deflect the light coming from an object, such as A, to left and right as well as up and down, such deflected rays of light passing through different quadrants of the lens L and of the color filter S, so as to obtain four separate images $A^b$, $A^g$, $A^r$ and $A^y$ respectively on the respective quadrants of sensitized layer in the plane P (Fig. 3). These images, as denoted by the indices, are formed by the rays of light which have passed through the blue, green, red, and yellow quadrants (B, G, R, Y) respectively of the filter S.

When this fourfold image has been developed and fixed (and printed, if desired) in any well-known or approved manner, a projection in natural colors is obtained therefrom in the following manner: The image (which for the sake of clearness shall be designated as the film image, although it need not be on a film) is placed in a plane, such as P', perpendicular to the optical axis O' of the projecting apparatus (Figs. 4 and 5) and being illuminated in any suitable manner (not shown) is projected on a sheet or screen P² with the aid of a lens L, of a color filter S, and of a compound prism C, C' of the same construction as those described in connection with the picture-taking apparatus. The compound prism will deflect the light in such a manner that sixteen different images will be thrown on the screen P², four of these images containing red, four blue, four yellow, and four green. However, the arrangement is such that some of the sixteen images will become superposed on the same portions of the screen P², so that only nine images will become visible as illustrated in Fig. 6. In this figure diagonal shading indicates the two (square) portions of the screen P² on which the green and yellow light falls, respectively, while the (square) portion receiving blue light is shaded horizontally, and the (square) receiving red light is shaded vertically. These portions or areas overlap, as shown, and thus while the four corner images are of one color only, the four intermediate marginal images are each formed by two colors, and the central image A$^c$ results from the superposition of four images colored red, blue, yellow and green, respectively, and thus reproduces the natural colors of the original object A. It will be understood that this central image A$^c$ is the only one that my invention relates to, the other images being surplusage. This central image, since it receives at least twice as much light as any of the others, will be much more prominent, and even if all the images were visible at the same time, the effect of the central image would therefore predominate. However, all the marginal or surrounding images may be readily eliminated by shutters or other expedients, the simplest of which would consist in making the projection screen just large enough and of proper position to receive only the central picture or image A$^c$. The prism, filter and lens are arranged in any order as explained with reference to the picture-taking apparatus.

Similar, although not so perfect results may be obtained by using two (complementary) colors, say red and green, instead of four (two pairs of complementary colors), as in the first example. Figs. 7 and 8 illustrate this two-color process as applied in making the exposure, and Fig. 9 shows the resulting camera image. The apparatus differs from the one shown in Figs. 1 and 2 by the use of a single prism C' with horizontal axis, and of a color filter S' having only two (superposed) portions of different (complementary) colors, say red and green. As will be understood from Figs. 10 and 11, the projecting apparatus in this case has a simple prism and a two-color filter of the same character as the picture-taking apparatus shown in Figs. 7 and 8, and the resulting projected image, shown in Fig. 12, consists of four images (two red and two green) two of which however are superposed to form the central image A$^c$ in natural colors; the other images, which are red and green respectively, may be eliminated as suggested in connection with the first form of my invention.

For the purpose of clearer illustration, the object A has been misrepresented in Figs. 1 and 7, as if the inclined portions shown at its ends were in a plane containing the optical axis O, when as a matter of fact (in order to produce the film images of Figs. 3 and 9) such inclined ends lie in a plane perpendicular to said axis.

In the constructions described above, what may be termed the ridges of the prisms C, C', that is to say, the edges which do not lie in the base or contact surface (perpendicular to the optical axis O or O') are located at the center of the apparatus, that is to say, said ridges or edges intersect the optical axis O or O'. This, however, is not essential. Thus in Fig. 13, the member C' of the prism, facing the lens L, is constructed as before, with its ridge passing through the optical axis, but instead of the similar member C of the constructions shown in Figs. 1, 2, 4 and 5, I have shown two right-angled prismatic members C'' each having its base in contact with one half of the base of the member C' (said bases being perpendicular to the optical axis), the thin edges of said members C'' meeting at the center, while their ridges are at the outer portions and do not intersect the optical axis. Prisms of the character shown in Fig. 13 are particularly suitable for use in the projecting apparatus.

The prisms themselves may be color-corrected or achromatized, similarly to the color-correction employed for lenses. Figs. 14 and 15 illustrate a compact arrangement in which both lens and prisms are color-corrected. The prisms are of the same character as in Figs. 1, 2, 4 and 5, so far as their exposed surfaces are concerned, but each of them is made of a portion $f$ of flint glass and a portion $c$ of crown glass, which latter, for the sake of easier manufacture, may be made in two pieces, each of prismatic shape. The lens shown in conjunction with this compound prism comprises four individual lenses or quadrants, corresponding to the four quadrants of the color filter and each of these individual lenses comprises a portion $l$ of crown glass and a portion $l'$ of flint glass. The prisms and the lens may be fitted in a holder H which may be readily attached or mounted as a unit on a camera of ordinary construction.

It will be understood that the showing in

Figs. 13, 14 and 15 is fragmentary, the color filter being omitted from these views.

The several forms of my invention are of such simplicity that they may be readily attached or adapted to cameras or projecting apparatus of usual construction.

The invention is applicable in various ways, as to the production and projection of pictures in colors, either stationary or so-called moving pictures, or to other color processes where a number of pictures or images are combined or superposed in registry, for instance in photo-engraving or in lithographic work.

I have illustrated a selected application of the invention but it is to be understood that the invention may be applied to any of the photographic arts.

I claim:

1. An apparatus for taking or projecting images, comprising a lens, a transparent filter and a compound prism located to act on a ray of light successively, said compound prism consisting of two prisms located one in advance of the other and having a common base, while the edges of said prisms remote from such base extend in mutually perpendicular directions, and said filter having four portions arranged in two pairs of complementary colors and correlated to the images formed by said compound prism.

2. An apparatus for taking or projecting images, comprising a lens, a transparent filter and a compound prism located to act on a ray of light successively, said compound prism consisting of sections located one in advance of the other and having their axes located in different directions, while their adjacent faces are parallel, and said filter having portions of different colors correlated to the images formed by said compound prism.

3. An apparatus for taking or projecting images, comprising a lens, a transparent filter and a compound prism located to act on a ray of light successively, said compound prism consisting of two prismatic systems located one in advance of the other and having their adjacent faces parallel while their axes extend in mutually perpendicular directions, and said filter having four portions, in two pairs of complementary colors, correlated to the images formed by said compound prism.

4. In apparatus for taking or projecting images, a compound prism consisting of two prismatic systems, the axes of which extend in mutually perpendicular directions, each of said systems comprising portions made of glass of different optical qualities to obtain color-correction.

5. In apparatus for taking or projecting images, a compound prism consisting of two prismatic systems, the axes of which extend in mutually perpendicular directions, each of said systems comprising portions made of glass of different optical qualities to obtain color-correction, a lens located adjacent to said compound prism, and a common holder for said prism and lens.

6. In apparatus for taking or projecting images, a compound prism consisting of two prismatic systems, the axes of which extend in mutually perpendicular directions, a lens located adjacent to said compound prism, in the same optical axis therewith, and a common holder for said prism and lens.

In testimony whereof I have hereunto set my hand this 13th day of April, 1920.

IRA FURMAN.